No. 765,321. PATENTED JULY 19, 1904.
W. POTTER.
LEVEL AND PLUMB.
APPLICATION FILED NOV. 2, 1903.
NO MODEL.
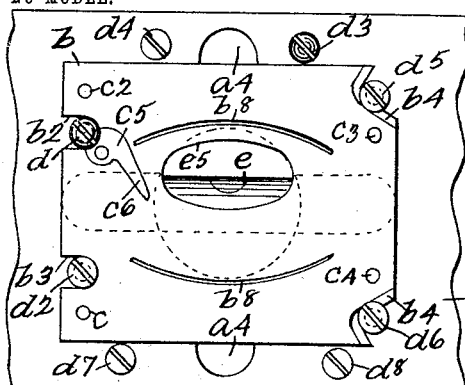
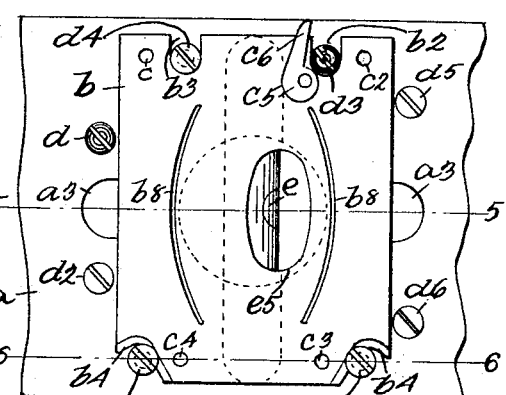
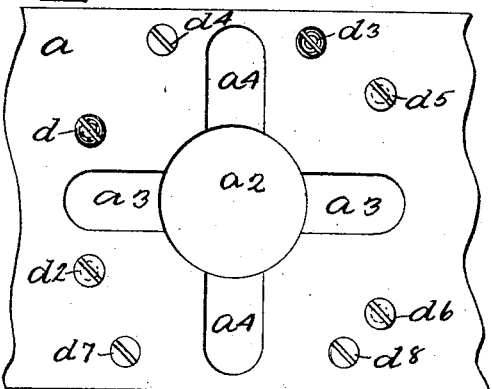
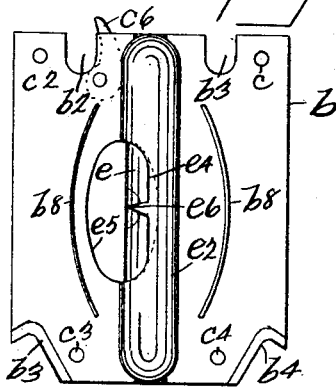
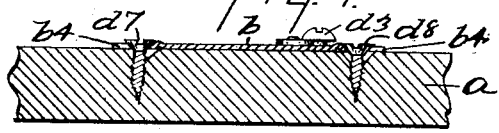
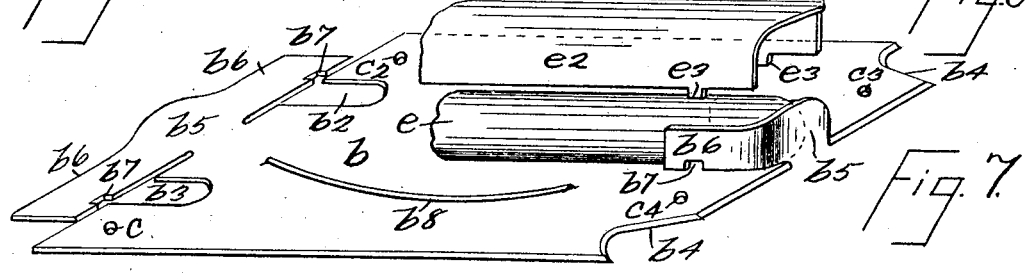
WITNESSES
Joseph R. Dunn
Harry Kraft
INVENTOR
William Potter
BY
J. Chris Larsen
ATTORNEY No. 765,321.   Patented July 19, 1904.

UNITED STATES PATENT OFFICE.

WILLIAM POTTER, OF NEW YORK, N. Y.

LEVEL AND PLUMB.

SPECIFICATION forming part of Letters Patent No. 765,321, dated July 19, 1904.

Application filed November 2, 1903. Serial No. 179,478. (No model.)

*To all whom it may concern:*

Be it known that I, WILLIAM POTTER, a citizen of the United States of America, residing at New York, in the county of New York and State of New York, have invented certain new and useful Improvements in Levels and Plumbs, of which the following is a specification, such as will enable those skilled in the art to which it appertains to make and use the same.

The object of this invention is to provide a level adapted to be placed upon a straight-edge and be readily removable therefrom and which may be also used as a plumb in connection with the same straight-edge by simply turning said level through an arc of ninety degrees, a further object being to provide such an instrument which may be easily and quickly adjusted in either of its positions by simply altering the height of two screws at one end of said instrument and which may also be removed from said straight-edge by simply moving a clip on the other end of said level and then be adapted for use independently either as a level or plumb, and a still further object being to provide an instrument of this class which is simple in construction and operation, well adapted for the purpose for which it is intended, and very inexpensive.

My invention is fully described in the following specification, of which the accompanying drawings form a part, in which the separate parts thereof are indicated by suitable reference characters in each of the views, and in which—

Figure 1 is plan view of my instrument in operative position upon a straight-edge for use as a level; Fig. 2, a similar view thereof, but in position for use as a plumb; Fig. 3, a view of a portion of a straight-edge with the level removed and showing the fixed screws; Fig. 4, a view of the level turned over and showing the position of the spirit-tube thereon; Fig. 5, a section on the line 5 5 of Fig. 2; Fig. 6, a section on the line 6 6 of Fig. 2, and Fig. 7 a perspective view of the blank forming the base of the instrument and showing the method of placing and holding the spirit-tube and also a cap for covering the same.

In the drawings forming a part of this specification I have shown a portion of a straight-edge $a$, provided with a central circular opening $a^2$ and radial recesses $a^3$, laterally arranged, and radial recesses $a^4$, transversely arranged, the recesses $a^3$ and $a^4$ being of a length in each direction equaling the length of the plate $b$, which serves as the base of my instrument.

The plate $b$ is rectangular in form, and in the manufacture thereof is stamped from a sheet of thin metal substantially in the form shown in Fig. 7, with two-armed lugs on each end thereof and with recesses $b^2$ and $b^3$ and recesses $b^4$ at the opposite ends, said lugs being designated by the reference characters $b^5$, with arms $b^6$ connected therewith, these arms being also provided with indentations or recesses $b^7$ on their sides adjacent to the body of the plate $b$, and when the plate $b$ is so composed of light material I prefer to stamp strengthening-ribs $b^8$ therein. The plate $b$ is also provided with guide-holes $c$ and $c^2$ near one end and similar holes $c^3$ and $c^4$ near the other end and the reason for which will be hereinafter explained, and upon the upper face of the plate $b$, adjacent to the recess $b^3$, I pivot a cam $c^5$, provided with a handle member $c^6$, which preferably lies flat, but which may be bent at right angles to said cam for the purpose of a better and firmer hold in operating said cam.

Mounted in the straight-edge $a$ at the left of the drawings are two screws $d$ and $d^2$, the screw $d$ of which is of the round-head variety, and near the edge of the straight-edge corresponding to the top of the drawings are two similar screws $d^3$ and $d^4$, the one, $d^3$, of which is of the round-head variety, and opposite the screws $d$ and $d^2$ are screws $d^5$ and $d^6$, both flat-head, and opposite the screws $d^3$ and $d^4$ are two screws $d^7$ and $d^8$, both flat-head, and the reason for which will be apparent.

The plate $b$ is provided near its center with an oval opening, beneath which is mounted a spirit-tube $e$, which extends laterally along the center of the plate $b$ and parallel to the sides thereof and is held in two cups formed by bending up the lugs $b^5$ at right angles to the plate $b$ and then bending the arms $b^6$ thereof inwardly, as clearly shown in Fig. 7, and over the tube $e$ is a cover $e^2$, provided with lugs $e^3$, which are bent inwardly and passed into the recesses $b^7$ in the arms $b^6$, and the tube $e$ is thereby held firmly in position, but may be readily removed in the event of breakage or for other cause, and the cover $e^2$ is provided with an opening $e^4$, near the center thereof, through which the tube may be seen from one side, said tube being visible from the other side by means of the opening $e^5$ in the plate $b$, and centrally arranged over the tube $e$ and integral with the cover $e^2$ is an index or pointer $e^6$, which indicates when said instrument is exactly level.

In the use of my instrument when it is desired to use it as a level the plate $b$ is placed upon the straight-edge $a$ in the position shown in Fig. 1, the screws $d^5$ and $d^6$ being slipped into the recesses $b^4$ against the edges thereof, said edges being downwardly and outwardly inclined to correspond to the angle of the under side of the flat heads of the screws, the recesses $b^2$ and $b^3$ are then passed over the heads of the screws $d$ and $d^2$, the cam $e^5$ being then turned into the position shown in Fig. 1, at which time the edge thereof passes beneath the head of the screw $d$, and the further the cam is turned the more firmly the plate $b$ is forced against the screws $d^5$ and $d^6$ and held on the straight-edge, the tube $e$ and cover $e^2$ therefor resting in the longitudinal recess $a^3$ and the reading of the tube being made through the opening $a^2$. When the instrument is so placed and is out of true as regards the edge of the straight-edge, the loosening of one of the screws $d^5$ or $d^6$ and tightening of the other will move that end of the plate transversely of the straight-edge $a$, because of the bevel edges of the plate against which the screws $d^5$ and $d^6$ operate or bear, and the spirit-tube may thereby be adjusted with reference to the straight-edge $a$, and when the instrument is desired to be used as a plumb the operation just described is repeated by turning the plate $b$ to the position shown in Fig. 2, the screws $d^3$ and $d^4$ at the top and the screws $d^7$ and $d^8$ at the bottom of said plate and the tube $e$ resting in the transverse recess $a^4$, and the tightening or loosening of the screws $d^7$ and $d^8$ adjusts the instrument in this position. It will therefore be seen that the simple turning of the cam $e^5$ releases the instrument from the straight-edge, and as the tube $e$ is parallel to the sides and perpendicular to the ends of the plate $b$ the instrument may be used independently of the straight-edge and may be readily stored or packed in a tool-box; but it will also be seen that while mounted upon the straight-edge the tube $e$ is protected from injury, as it does not project above the plate $b$ on its outer face.

The guide-holes $c$, $c^2$, $c^3$, and $c^4$ are used to locate the positions of the screws in the straight-edge $a$, the holes at one end of the plate $b$ being in the positions of the screws intended to be at the opposite end of the plate $b$ when in operative position, and in this way accuracy is assured and time saved in the operation of mounting the instrument upon the straight-edge.

My invention is simple in construction and operation and is very inexpensive, and various changes in and modifications of the construction herein shown and described may be made without departing from the spirit of my invention or sacrificing its advantages.

Having fully described my invention, what I claim as new, and desire to secure by Letters Patent, is—

1. An instrument of the class described, comprising a base-plate, a spirit-tube held thereon and a cap for said tube, said base-plate being provided with an upwardly-directed lug at each end thereof, each of said lugs having two inwardly-directed arms and each of said arms having a recess in the bottom thereof, said cap being provided with lugs adapted to engage said recesses and said tube being held between said arms and said cap, substantially as shown and described.

2. An instrument of the class described, comprising a straight-edge, a plate mounted thereon, a spirit-tube held on said plate, said plate being provided with recesses at each end thereof, screws in said straight-edge and bearing against said recesses, a cam on said plate adjacent to one of said screws and adapted to pass beneath the head thereof and said plate being provided with holes for determining the positions of said screws, substantially as shown and described.

3. An instrument of the class described, comprising a straight-edge, a plate mounted thereon, a spirit-tube on said plate, said plate being provided with a plurality of segmental recesses at one end thereof and with beveled recesses in the opposite end corners, screws in said straight-edge and passing through said first-named recesses, one of said screws being shoulder-headed, flat-head screws in said straight-edge and bearing against the bevel edges of said last-named recesses and a cam on said plate adjacent to said shoulder-headed screw and adapted to pass thereunder, substantially as shown and described.

4. An instrument of the class described, comprising a straight-edge, a plate mounted thereon, a spirit-tube held on said plate adjacent to said straight-edge, said straight-edge being provided with a central circular opening and radial recesses, in line with and at right angles to the edge of said straight-edge, and adapted to receive said tube in the corresponding position thereof, and means for adjustably connecting said plate with said straight-edge, substantially as shown and described.

5. An instrument of the class described, comprising a straight-edge, a plate mounted thereon, a spirit-tube on said plate, two screws in said straight-edge at one end of said plate, a screw in said straight-edge at the other end of said plate, and a cam on said plate adjacent to said last-named screw and the operation of which forces the same beneath the head of said screw and forces said plate firmly against said first-named screws, substantially as shown and described.

6. An instrument of the class described, comprising a straight-edge, a plate mounted thereon, a spirit-tube on said plate, said plate being provided with bevel-edged recesses at one end thereof and segmental recesses at the other end thereof, devices for locking one end of said plate, detachably, to said straight-edge and means for adjustably locking the other end of said plate to said straight-edge, comprising bevel-headed screws bearing against the bevel edges of each of said first-named recesses and the turning of which in opposite directions, alternately, moves said plate correspondingly, substantially as shown and described.

In testimony that I claim the foregoing as my invention I have signed my name, in presence of the subscribing witnesses, this 31st day of October, 1903.

WILLIAM POTTER.

Witnesses:
JOSEPH R. DUNN,
HARRY KRAFT.